Oct. 7, 1969
R. M. HISEY ET AL
3,471,682
RADIANT HEATING APPARATUS
Filed Feb. 7, 1968
2 Sheets-Sheet 1
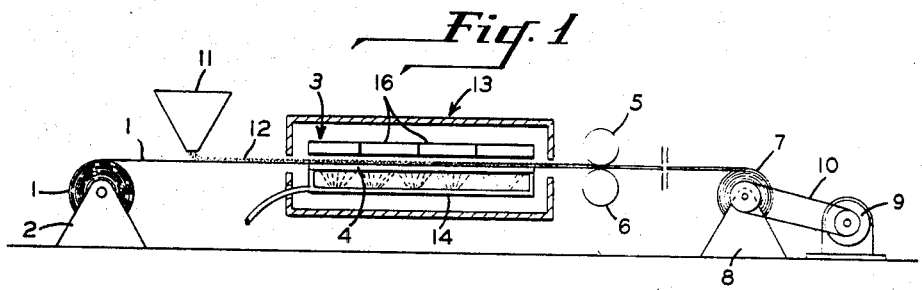
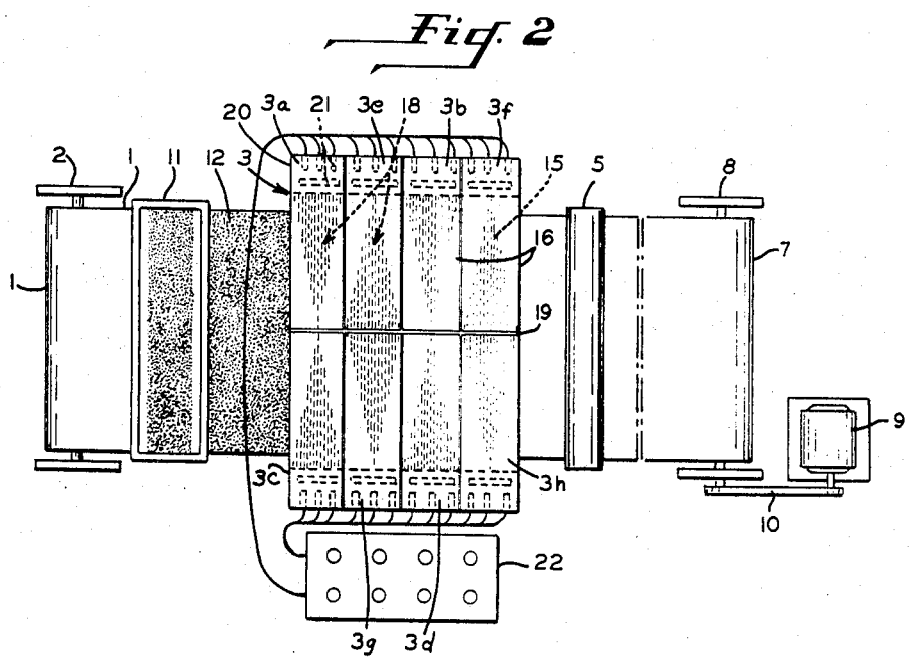
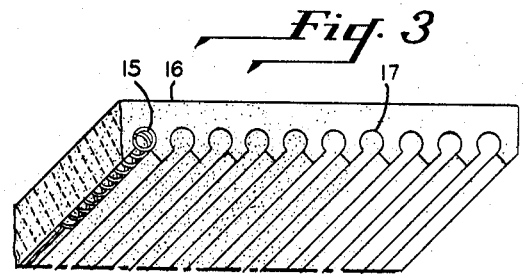
INVENTORS
RICHARD M. HISEY
JOSEPH H. KYLE
BY George L. Herr
ATTORNEY

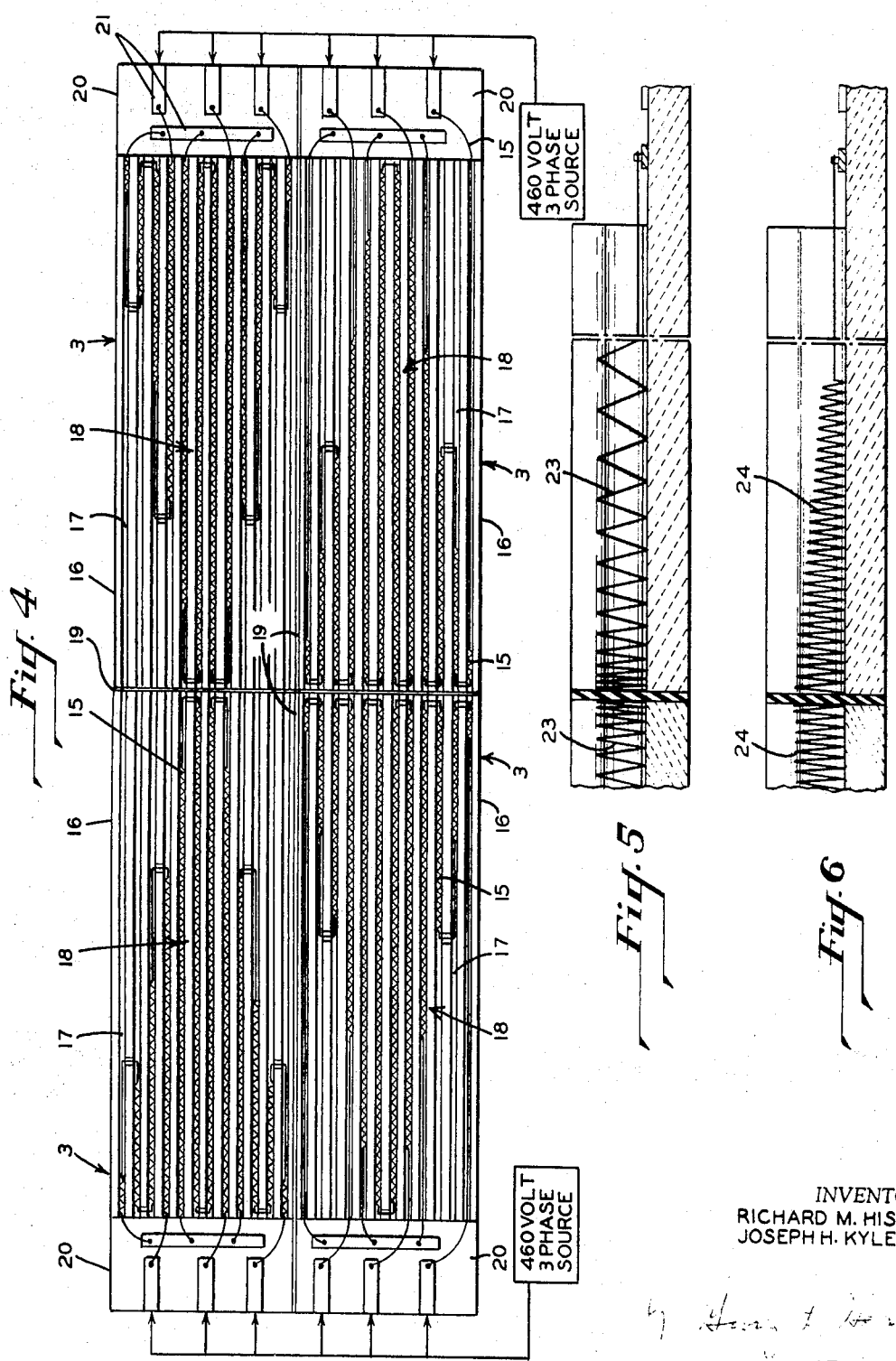
INVENTORS
RICHARD M. HISEY
JOSEPH H. KYLE
ATTORNEY

United States Patent Office 3,471,682
Patented Oct. 7, 1969

3,471,682
RADIANT HEATING APPARATUS
Richard M. Hisey, Lancaster, Pa., and Joseph H. Kyle, Bernardsville, N.J., assignors to Armstrong Cork Company, Lancaster, Pa., a corporation of Pennsylvania
Filed Feb. 7, 1968, Ser. No. 703,775
Int. Cl. F27b 9/06
U.S. Cl. 219—388
9 Claims

ABSTRACT OF THE DISCLOSURE

An apparatus for uniformly heating and fusing a moving layer of granular components to form a sheet wherein a double row of individually controlled heaters having substantially triangularly shaped effective heating areas are used. The triangularly shaped heating area of each heater is positioned oppositely with respect to that of an adjacent heater in the same row and also with respect to an opposing heater in the other row.

BACKGROUND OF THE INVENTION

Field of the invention

The present invention relates to a heating apparatus for uniformly heating a moving layer of material. More particularly this invention is concerned with an electric heating apparatus for uniformly heating and fusing the moving layer of granular plastic material to form a sheet.

Description of the prior art

Radiant heaters have previously been widely used to heat moving webs of material in the flooring industry and other allied industries. In some instances, the radiant heaters have been used both above and below the moving web. In other cases, the radiant heaters are used as top heaters only and large metal platens are used as bottom heaters. In these heaters the large metal platens contact the moving web and, therefore, transfer heat from the platen to the web. These platens may be heated electrically or by vapors or fluid.

In the past, the radiant zone heaters used for heating moving webs of material were of a uniform watt density over the entire face of the effective heating area. However, even though the radiant heater was uniform in its output to the moving web, the resultant temperature of the moving web in the across-machine direction varied substantially.

In the making of plastic flooring, plastic components are fed onto a moving belt, web, or backing material which then passes through a heater and through consolidating rolls to form a sheet. Due to inevitable variations in the density of the layer of plastic components deposited on the backing, formulation and color of the plastic material, the effect of ambient air flowing over the material and the transfer of heat from the exposed edges of the bottom platen to the moving material, it was consequently nonuniformly heated by prior heaters which provided a uniform heat over the entire face of the effective heating area. This resulted in lack of fusion in some areas of the layer of plastic material and overheating and discoloration in others. When such a sheet is passed between the consolidating rolls, the application of uniform pressure to a sheet which was nonuniform in thickness and the degree to which it was heated caused a difference in gauge and this combined with the foregoing resulted in waste and an inferior product. In the past, for example, the plastic sheets which were normally made 75" wide had to be trimmed to 72" because of the discoloration of the edges due to overheating thereof.

As an example, one of the standard zone heaters formerly used in the heating of a layer of moving plastic components was constructed to provide a uniform output of 20 watts per inch square over an 8" x 85" effective heating area of the heater. Although the heater output was uniform across the 85" face of the heater, the resulting product temperature varied as much as 30° F. from edge to edge. This temperature variation most frequently occurs as either a "hot edge" or a "cold edge." Each of these conditions is the result of a different phenomenon.

The "hot edge" condition can be caused by either having too high a watt density radiating source localized at the edge of the granular plastic layer, or by having a bottom metal platen extend beyond the edges of the layer where the platen can absorb the radiant energy from the top radiant heater. Radiant energy absorbed by the platen from the top radiant heater is conducted to the edge of the goods. In addition radiant energy from top and bottom heaters will interact where there is no web to absorb the energy. This will result in a higher element temperature of the radiating source.

A "cold edge" is caused by ambient air flowing over the edge of the layer of plastic components and into the heating tunnel. This flow of air into the tunnel is caused by the natural convection currents created by the expanding heated air and the fume exhaust systems, both of which tend to remove air from the discharge end of the heating tunnel. This problem varies from line to line depending upon how well the heating tunnel is enclosed. Prior to the present invention, there has been no satisfactory means of controlling product temperature from edge to edge on the plastic mix consolidation lines in the floor covering industry.

The prior art considered pertinent to this application includes: Patent 1,110,532; 2,526,906; 2,871,332 and 2,995,646. These patents are examples of prior disclosures of heating elements of such design that heat would be supplied in the amounts required to the specific areas where it would be needed without any abrupt change in the heat output in a given area. The use of heating coils having variations in the spacing and pitch of the coils for this purpose is also shown.

In particular, Patent 2,871,332 discloses a dielectric heating electrode array for treating articles moving through the field of the array. A plurality of adjustable elements by means of which the effective heating area of the electrodes can be varied at different points along the length of the array is disclosed.

Basically, Patent 2,871,332 provides for varying the field strength of the individual electrodes by moving them in a direction parallel with that of the path of travel of the goods being treated. This movement causes contact by the movable electrodes with more or fewer of the fixed transverse electrodes 6a. This inevitably alters the overall configuration of the collective electrodes, or in other words changes the overall shape of the collective electrodes to suit a particular occasion.

First, dielectric heating of granular plastic is not practical because of the relatively poor resistance qualities of the plastic and, in addition, the relatively high resistance of the backing on which the granular plastic rests would cause the backing to get hotter than the plastic.

Second, the heating elements of Patent 2,871,332 must be moved to vary the location and degree of heat. No specific pattern of heat can be variably controlled and no individual electrode can provide a different degree of heat without movement thereof or without affecting the performance of the other electrodes because of higher voltage applied, etc.

Third, there is the problem of moving the individual electrodes without stopping movement of the web or material being treated.

Fourth, due to the longitudinal movement of the electrodes, the degree of heating at any given transverse area of the sheet is not adequately controlled.

Fifth, both top and bottom electrodes are required.

The heater of this invention solves the foregoing problems. First, it is well known that the use of radiant heat is the most effective way to heat a moving layer of granular plastic. By providing two rows of radiant heaters of such design and arrangement and capability of control that an infinitely variable pattern of heat may be provided in any densities desired, immediately, without any movement of the heaters and without stopping movement of the layer, continuous edge-to-edge control of the heating of a transverse area across the layer is provided. In addition with this radiant heater there is no need for a bottom element below the sheet in order for the top element to operate.

Patent 1,110,532 shows a plurality of heating elements comprising a variable pitch coil mounted on a core or rod for providing concentrations of heat adjacent the walls of an incubator and less in the intermediate portion thereof.

In this patent, all of the heaters are turned on, or all turned off, at any given time. They are not individually controllable or adjustable for selectively varying the location and densities of the heat patterns. Of course, not being concerned with applicants' problems, no solution therefor is advanced by this patent.

Patent 2,526,906 relates to a heating roller having coils spaced closer at the ends than in the center. Patent 2,995,646 relates to a heating element showing increased heating in the center. These patents are of general related interest only and do not provide any solution to the problem solved by the invention herein.

Various other means were tried unsuccessfully to achieve uniform heating of the moving layer of plastic components, such as shields for the extending edges of the bottom heating platen and cooling coils using water or oil. However, shielding proved unsuccessful and, due to the high operating temperature required (375° F.– 425° F.) water turns to steam and the use of oil is hazardous. The temperature of the heating element is about 1,400° F.

In view of the foregoing, it can be seen that thus far, there has not been a satisfactory means of controlling product temperature from edge to edge on the plastic mix consolidation lines.

To accomplish the desired results of this invention, it is necessary to have, as this invention has, multiple radiant heaters which are individually controlled and, which are so shaped and arranged, that an almost infinite variety of heat patterns and densities can be obtained.

By use of the present invention in the fusing of granular plastic material for making floor covering, an improvement in the cure of the material and consequently an improved product results. Each heater's output can be varied individually without interfering with the movement of the passing backing and the granular plastic material carried thereon and, since the heating needs of each layer of plastic material differ, depending upon colors used, ingredients, thickness, the amount of limestone and filler in the sheet, etc., the heater of this invention is ideally suited to achieve the desired results in a relatively simple and practical manner.

Th heaters of this invention provide the capability to obtain a uniform edge-to-edge "goods" temperature by compensating for parameters which normally would disturb this equilibrium.

SUMMARY OF THE INVENTION

This invention is directed to an improved electrical heating apparatus adapted to provide a variable heat pattern on a moving layer of components to uniformly heat and fuse them into a sheet. Uniform edge-to-edge heating of moving layers of such material has been a problem in the past because of variables in the material and surrounding conditions and the use of prior heaters which provided a uniform heat output across its entire face.

This problem has been solved by providing multiple ceramic block heaters, each having an individually controlled assembly of heat generating elements thereon.

The assembly of heating elements on each block is provided in one area of the assembly in the greatest concentration and in progressively diminishing amounts extending therefrom. The area of greatest concentration of heat generating elements of each heater is preferably rotated 180 degrees relative to that of an adjacent heater in the same row and also to an adjacent heater in the opposite row. That is, the positioning of adjacent heat generating elements results in one heater being the mirror image of the adjacent heater in the opposing row.

The coaction and controllable cooperation of the heaters having this arrangement of heating elements results in a sensitiveness of control, flexibility and variability of heat patterns which, when used to heat a moving layer of plastic components or material, results in an improved, even, edge-to-edge heating and, consequently, an improved product not obtainable by use of prior heating devices.

It is, therefore, an object of this invention to provide an electrical heating apparatus adapted to provide an infinite variety of heat patterns and densities thereof on a layer of plastic components moving past the heater to achieve uniform heating thereof from edge to edge. This is achieved by utilizing the variable heat patterns to compensate for parameters which would normally disturb this equilibrium.

DRIEF DESCRIPTION OF THE DRAWINGS

In the drawings, FIG. 1 is a diagrammatic side elevational illustration of one form of apparatus in which the heater of this invention may be used;

FIG. 2 is a top plan view of the apparatus of FIG. 1 with the heating tunnel cover removed;

FIG. 3 is a partially broken away perspective view of one of the grooved ceramic block support forms showing one of the heat generating elements positioned therein;

FIG. 4 is an enlarged bottom plan view of four of the heaters of this invention illustrating the positioning of the heat generating elements thereon;

FIG. 5 is a partially broken away sectional view of a support from including another from of heating coil usable in this invention to achieve the heat distribution desired; and FIG. 6 is a partially broken away sectional view of a support form showing another form of heating coil usable in this invention.

DESCRIPTION OF THE PREFERRED EMBODIMENT

Referring to FIG. 1, there is shown a roll of backing material 1 mounted on a supporting stand 2. In operation, the backing material 1 passes beneath a hopper 11 and a layer of plastic components 12 is deposited thereon. The backing material 1 carrying the plastic components 12 then moves into heating tunnel 13 and the plastic components 12 are fused as the sheet passes between a series of top heaters 3 and a bottom heating platen 4. Bottom platen 4 may be provided with appropriate heating means 14.

In the embodiment best shown in FIG. 2 of the drawings, the top heaters 3 consist of a double row of heaters with four heaters in each row. In use, the four "edge-to-center" tapered heaters 3a, 3b, 3c and 3d vary uniformly from 25 watts/inch squared at the edge to 15 watts/inch squared at the center (of the double row). The four "center-to-edge" tapered heaters 3e, 3f, 3g and 3h vary uniformly from 25 watts/inch squared at the center (of the double row) to 15 watts/inch squared at the edge. With these heaters so arranged that the area of greatest concentration of the effective heating area of adjacent heaters in the same row and in the opposing row are oppositely positioned, the theoretical average watt density of 20 watts/inch squared is available when each heater segment is operated at 100%. After heating, the sheet is passed between consolidating rolls 5 and 6 after which it is wound onto wind-up roll 7 mounted on a stand 8 by means of drive means 9 and drive linkage 10. Suitable accumulating means (not shown) may be provided between heating tunnel 13 and wind-up roll 7 to allow for cooling of the plastic sheet before it is wound into a roll.

If desired, a guard (not shown) in the form of a fiber glass sheet may be positioned over the grooved face of the ceramic block and an expanded metal screen may be placed over the outer face of the fiber glass sheet. Also, if desired, known temperature sensing means may be positioned at spaced intervals across the width of the sheet adjacent the surface thereof. Suitable means operating in response to indications of the sensing means to control the selection of heaters to be used and the amount of voltage supplied thereto may also be provided.

As best seen in FIGS. 3 and 4, the heat generating elements 15 (shown by dotted lines in FIG. 2) are mounted on ceramic block support forms 16 in longitudinal grooves 17 thereon. The grooves 17 provide support for heat generating elements 15 to eliminate sagging thereof when hot, thus eliminating "hot spots" in the heat pattern. However, obviously, other support means for the elements 15 could be used for this purpose and the heating elements 15 could be mounted on an ungrooved support form. The elements 15 are of such configuration and arrangement of distribution of amounts thereof as to form substantially triangularly shaped effective heating areas 18 on the support forms 16. It will be noted that the triangularly shaped effective heating area 18 of each of the heaters 3 is positioned on its support form oppositely with respect to that of an adjacent heater in the same row and also with respect to that of an opposing heater in the other row. The desired concentration of the heating elements 15 may be achieved by varying the configuration thereof. For example, the elements 15 may consist of coiled and/or coiled and straight portions of varying lengths and the coils may be of constant pitch and diameter or, as shown in FIG. 5 of the drawings, the coils may vary in spacing and pitch or, as shown in FIG. 6, they may vary in diameter and center locations. As best seen in FIG. 4, support forms 16 are electrically insulated from each other as indicated at 19. Terminal block end portions 20 having suitable electrical connections 21 (for wires 15) are provided on each of the support forms 16. Control means 22 (FIG. 2) are provided to individually vary the output of each of the heating elements 15. Modified heating coils 23 and 24, shown in FIGS. 5 and 6, may be substituted for heating elements 15 in the heaters 3 to achieve the desired heat distribution.

When using the coils shown in FIGS. 5 and 6, the substantially triangularly shaped heating area of each heater is achieved by, in the coil of FIG. 5, appropriately varying the pitch and the spacing of the coils of the heat generating element, and in FIG. 6 by appropriately varying the diameter and center location of the coils.

The use of strips, rods, bars, etc. arranged to achieve the desired tapered effective heating area described have also been contemplated as usable in this invention.

As the web 1 carrying plastic material 12 passes into the heating tunnel 13, the plastic layer 12 normally varies somewhat in thickness and, consequently, if the plastic layer 12 were to be heated by prior art heaters it would be nonuniform in the amount of heat absorbed thereby. The heaters of this invention may be selectively used and controlled to compensate for the heat absorption differential of the layer of plastic components caused by variations in thickness of the layer, as well as the formulation and density thereof, the amount of filler and the color used. As previously noted, by selective use of the almost infinite variety of heat patterns available with the heaters of the present invention, discoloration and waste in the finished product due to other factors may be avoided. Among these factors are the previously mentioned absorption of heat from the top heaters by the portions of the bottom platen which extend beyond the sheet and consequent transfer of the heat to the sheets' edges, and the cooling effect of air currents flowing over the goods and heating elements. It can therefore be seen that, by the use of the heater of this invention, a uniformly varying watt density from center to edge and edge to center of the plastic sheet can be provided which results in a uniform "edge-to-edge" goods temperature by compensating for parameters which would normally disturb this equilibrium.

The necessary temperature adjustments can be made to the heaters of this invention by supplying a constant voltage thereto controlled by timers to restrict the "on-time" voltage supply, or by using a saturable core reactor to provide an infinitely variable voltage.

Known heat sensing devices may be used to detect temperature variations across the width of the sheet and operate suitable control means for varying the voltage supply to the appropriate heater or heaters.

Obviously the heaters of this invention may be used either above, below or above and below a moving sheet of material for the purposes previously stated.

While preferred embodiments of the features of the invention are shown, it will be understood that various modifications may be made therein without departing from the invention as defined in the following claims.

We claim:
1. The combination of means for moving a layer of granular particles along a longitudinal path and means spaced from said layer to uniformly heat and fuse the same, said heating means comprising,
   (a) a first row of heaters consisting of electrically insulating support forms adapted to absorb and radiate heat therefrom, heat generating elements mounted on at least one face of each of said support forms, said heat generating elements being provided in the greatest concentration at one end of each support form and in progressively diminishing amounts along the lengths thereof, said concentration of said heat generating elements on each adjacent support form being located at opposite ends thereof,
   (b) a second row of heaters substantially duplicating said first row of heaters and electrically insulated therefrom, each of said heaters in said second row being positioned in substantially end-to-end relationship with, and in substantially the same plane and substantially along the same longitudinal axis as, an oppositely positioned heater in said first row, concentrations of heat generating elements in said second row of heaters being substantially mirror images of concentrations of the heating elements on an adjacent opposing heater in said first row, and
   (c) means for supplying electrical energy to each of said heaters and means for individually varying the amount of heat radiated thereby; whereby, the variably controlled heaters may be used to provide the desired distribution of heat to achieve the heat pattern desired on the moving granular material.

2. The combination of sheet moving and heating means according to claim 1 wherein the heat generating elements consist of conductive wires, each having a straight portion and a coiled portion.

3. The combination of sheet moving and heating means according to claim 2 wherein said coiled portion of said wires are of constant diameter and pitch.

4. The combination according to claim 2 wherein the coiled portions of the heat generating wires consist of coils which vary in spacing and pitch.

5. The combination according to claim 2 wherein said coiled portion of said wires are of constant diameter and vary in pitch and spacing.

6. The combination according to claim 2 wherein the wire coils vary in diameter and center locations.

7. The combination according to claim 1 wherein portions of said heat generating elements are of such configuration and extent as to collectively form a substantially triangularly shaped effective heating area on each of said support forms.

8. The combination according to claim 1 wherein said heat radiating support forms are ceramic blocks, each of said blocks having transversely spaced longitudinal grooves extending along the entire face thereof, and wherein said heat generating elements are positioned in said grooves.

9. Electrical heating means adapted to provide heat in controlled variable densities and patterns comprising,
  (a) a first row of heaters consisting of a plurality of electrically insulating support forms adapted to absorb and radiate heat therefrom, an assembly of heat generating elements mounted on at least one face of each of said support forms, said heat generating elements being provided in one area of said assembly in the greatest concentration and in progressively diminishing amounts extending therefrom, said greatest concentration of said heat generating elements on each adjacent support form being positioned oppositely to each other,
  (b) a second row of heaters positioned in substantially end-to-end, electrically insulated relationship with and in substantially the same plane and substantially along the same longitudinal axis as an oppositely positioned heater in said first row, said second row of heaters substantially duplicating said first row, including a like assembly of heat generating elements, said assembly of heat generating elements in said second row being positioned relative to an adjacent assembly in the first row so that the assembly in the second row has its greatest concentration of heat generating elements rotated 180 degrees relative to the adjacent heater's greatest concentration thereof, and
  (c) means for supplying electricity to, and individually varying the amount of heat radiated by each of said heating means on each of said heaters whereby, the variably controlled heaters may be used to provide the desired distribution of heat to achieve the pattern desired on an object being heated.

References Cited

UNITED STATES PATENTS

| | | | |
|---|---|---|---|
| 1,776,845 | 9/1930 | Summey | 219—388 |
| 2,432,800 | 12/1947 | Reichold | 219—553 X |

BERNARD A. GILHEANY, Primary Examiner

R. N. ENVALL, Jr., Assistant Examiner

U.S. Cl. X.R.

34—1; 219—553